United States Patent Office 3,393,974
Patented July 23, 1968

3,393,974
PROCESS FOR THE PRODUCTION OF SODIUM-TRIMETAPHOSPHATE
Hans Adolf Rohlfs and Heinz Schmidt, Wiesbaden-Biebrich, Germany, assignors to Chemische Werke Albert, Wiesbaden-Biebrich, Germany, a corporation of Germany
No Drawing. Filed Mar. 8, 1965, Ser. No. 438,088
13 Claims. (Cl. 23—106)

ABSTRACT OF THE DISCLOSURE

A process is disclosed for producing exceptionally pure sodium-trimetaphosphate involving heating a mixture of sodium-dihydrogenphosphate with about 0.5% to 20% as much of a nitrogenous salt capable of delivering ammonia to a temperature between 300° C. and the melting point of the mixture until the sodium-dihydrogenphosphate is produced, said salt delivering ammonia at said temperature. Suitable salts are typified by ammonium chloride, ammonium carbonate, ammonium sulphate or persulphate, ammonium nitrate (preferred), urea and guanidine.

---

It is known that by heating monosodiumphosphate water is split off and a water-insoluble polyphosphate—the so-called Maddrell's salt—is formed via the acidic pyrophosphate. By heating to a temperature between 505 and 607° C., preferably between 550 and 607° C., this salt is converted into the water-soluble sodium trimetaphosphate $(NaPO_3)_3$ during a technically reasonable period of time. This conversion occurs, however, in a narrow range of temperature, which may be maintained with difficulty only in a simple apparatus suitable for a continuous manufacture, i.e. a rotary tube furnace which inside is heated with gas. If the said minimum temperature is not reached no complete conversion of the Maddrell's salt occurs. If the melting temperature which is about 620° C. is, however, exceeded chain-like high-condensed phosphates are obtained.

According to another known process crystalline anhydrous sodium trimethaphosphate is obtained by cooling down melted sodium hexametaphosphate (Graham's salt). This cooling has to be carried out very slowly because trimethaphosphate is only formed in the said narrow range of temperature.

Due to these disadvantages one has already produced—instead of pure sodium trimetaphosphate—a mixture of sodium- and potassium-trimetaphosphate, which contains between about 12 and about 53 percent by weight in the form of the potassium salt. This process was said to have the especial advantage that the final product only contains still minor admixtures of between 0.5 and about 1% of water-insoluble polyphosphates.

It is further known that the speed of formation of tripolyphosphate or higher homologues from orthophosphate may considerably be increased if at least 1 percent by weight of one or more nitrates is added to the starting mixture. Suitable nitrates are said to be the alkali nitrates and more preferably the nitrates of alkaline earth metals, aluminum or ammonium-nitrate.

It is further known to heat a mixture of a stoichiometric amount of disodiumhydrogen phosphate and ammonium nitrate. In the reaction product about one half of sodium is present in the form of sodium nitrate and the other one in the form of trimetaphosphate which is contaminated by Maddrell's salt. Karbe and Jander stated the following in the Kolloid-Beiheften, volume 54 (1942), page 35:

"As in all said processes, however, the amount of the insoluble Maddrell's salt formed here varies very much according to circumstances, even if apparent equal external conditions are applied. Generally, however, a reasonable yield of trimetaphosphate is obtained."

It has now surprisingly been found that a pure sodium trimetaphosphate may be obtained in a simple manner. According to the invention a mixture of sodium-dihydrogenphosphate is heated with at least 0.5 percent, based on the weight of the sodium-dihydrogenphosphate, of a salt derived from an at most dibasic inorganic acid and ammonia or at least a compound generating ammonia when heated, preferably of nitric acid, to a temperature between 300 and the melting point of the reaction mixture. Generally the temperature is below 610° C. and preferably between 400 and 550° C.

The ammonium salts are suitably used in an amount of 1.5 to 10, preferably of 2 to 6 percent by weight. Larger amounts, e.g. 20% by weight may also be added. Suitable ammonium salts are for example ammonium chloride, ammonium carbonate, ammonium sulphate or ammonium persulphate, but above all ammonium nitrate. Suitable ammonia-delivering compounds are for example urea and guanidine. A mixture of a plurality of ammonium salts may also be used. Of course the use of such salts is preferred which are completely decomposed to gaseous products under the retaction conditions.

The process of the invention could not be deduced from the known state of the art since the ammonium compounds, as far as they have been used in the known processes in catalytic amounts, have been added in order to accelerate formation of chain-like phosphates instead of cyclic phosphates. Moreover German specification 966,681 expressly states that nitrates do not act catalytically in the manufacture of acidic sodium-pyrophosphate. Since sodium-dihydrogenpyrophosphate, however, is an intermediate in the manufacture of sodium-trimetaphosphate, one could not expect that just the compounds suggested by the invention have a catalytic effect in the present process. The fact that they are especially suitable for the acceleration of the formation of cyclic sodium trimetaphosphate is therefore very surprising; this being the more so since the manufacture of potassium and ammonium-trimetaphosphate is not possible in an analogous manner.

The process of the invention may be carried out either continuously or discontinuously in any suitable apparatus, e.g. those known per se. For example one may use a rotary tube furnace or with especial advantage, however, a spray tower. Often the catalytically effective compound is added to a water-containing melt of sodium-dihydrogenphosphate which may be produced for example by melting the dihydrate. The mixture of sodium-dihydrogenphosphate and the effective compound, e.g. ammonium nitrate, may, however, also be processed at a relatively low temperature to a solid product, e.g. by spraying, and this may be converted to sodium-trimetaphosphate.

According to the invention a product may be obtained which is practically a 100% sodium-trimetaphosphate, i.e. it contains only a small amount of Maddrell's salt or is substantially free even from traces of Maddrell's salt. A 1% aqueous solution of such reaction product is completely clear.

The invention will now be illustrated by the following examples. Percentages are by weight.

Example 1.—24.2 g. of $NaH_2PO_4$ were heated during 25 minutes form 100° C. to 450° C. The product obtained in which only about 75% of the total $P_2O_5$-portion were present in the form of trimetaphosphate contained 12.6% of "insoluble" material. If it was again calcined for 60 or 120 minutes respectively after reacting at said temperature, 1% aqueous solutions of the reaction products were still turbid. In comparison thereto a completely clear water-soluble trimetaphosphate was obtained already after heating the starting material to which 2% of $NH_4NO_3$ had been added during 22 minutes from 100° C. to 450° C. a trimetaphosphate was obtained which was free from Maddrell's salt.

Example 2.—In the following table the results are summarized, which have been obtained by heating during one hour at 400° C. a mixture of 24.2 g. of $NaH_2PO_4$ with the said amounts of the additive.

| Additive: | Percent insoluble |
|---|---|
| (a) No additive | 63 |
| (b) 0.12 g. of ammonium nitrate | 4 |
| (c) 0.24 g. of ammonium nitrate | 1.5 |
| (d) 0.48 g. of ammonium nitrate | 0 |
| (e) 1.28 g. of ammonium chloride | 4.6 |
| (f) 0.95 g. of ammonium sulphate | 5.3 |
| (g) 0.97 g. of ammonium carbonate | 7.2 |
| (h) 0.97 g. of urea nitrate | 2.2 |
| (i) 1.99 g. of guanidine carbonate | 5.2 |

If higher temperatures are used, e.g. those of Example 1, the results may considerably be improved.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A process for the production of sodium-trimetaphosphate, which comprises heating a mixture of (I) sodium-dihydrogenphosphate with (II) at least 0.5 percent, and at most 20 percent, calculated on the weight of the sodium-dihydrogenphosphate, of at least one nitrogenous salt to a temperature between 300° C. and the melting point of the said reaction mixture until sodium-trimetaphosphate is produced, said salt being selected from the group consisting of an ammonium salt and a salt of a nitrogenous compound generating ammonia at said temperature.

2. A process as claimed in claim 1, wherein the said salt is present in an amount ranging from 1.5 to 10 percent of the weight of the sodium-dihydrogenphosphate.

3. A process as claimed in claim 2, wherein the said salt is present in an amount ranging from 2 to 6 percent of the weight of the sodium-dihydrogenphosphate.

4. A process as claimed in claim 1, wherein the mixture is heated to a temperature in the range from 300 to 610° C.

5. A process as claimed in claim 3, wherein the mixture is heated to a temperature in the range from 400 to 550° C.

6. A process as claimed in claim 1, wherein the said salt of the at most dibasic inorganic acid is capable of being completely decomposed to gaseous products under the reaction conditions applied.

7. A process as claimed in claim 1, wherein the said salt is a salt of nitric acid.

8. A process as claimed in claim 2, wherein the said salt is ammonium nitrate.

9. A process as claimed in claim 2, wherein the said salt is added to an aqueous melt of sodium-dihydrogenphosphate before the reaction.

10. A process as claimed in claim 2, wherein the reaction is carried out by spraying in a spraying tower.

11. A process for the production of sodium trimetaphosphate which comprises reacting at a temperature between about 400 and 550° C. an aqueous melt of sodium-dihydrogenphosphate with an added nitrogenous salt of nitric acid which completely volatilizes at said temperature until said sodium trimetaphosphate is formed, said salt being used in an amount equaling 1.5 to 10 percent of the weight of the sodium dihydrogenphosphate and being selected from the group consisting of ammonium nitrate and a nitrogenous salt of nitric acid generating ammonia at said temperature.

12. A process as claimed in claim 11, wherein the said salt is ammonium nitrate.

13. A process as claimed in claim 12, wherein the reaction is carried out by spraying.

References Cited

UNITED STATES PATENTS 3,314,750    4/1967    Shen _____ 23—106

OSCAR R. VERTIZ, *Primary Examiner.*

L. A. MARSH, *Assistant Examiner.*